Patented Aug. 12, 1952

2,606,922

UNITED STATES PATENT OFFICE 2,606,922

ETHERIFIED PHENYL ALIPHATIC ACIDS AND THEIR SALTS

Domenick Papa, Brooklyn, N. Y., Erwin Klingsberg, New Brunswick, N. J., and Erwin Schwenk, Shrewsbury, Mass., assignors to Schering Corporation, Bloomfield, N. J., a corporation of New Jersey No Drawing. Application December 3, 1949, Serial No. 131,065

8 Claims. (Cl. 260—520)

Our invention relates to the manufacture of cyclically, including dicyclically, substituted aliphatic acids and their salts, and more particularly to iodo-alkoxy phenyl aliphatic acids wherein the phenyl group and either an aliphatic or homo- or hetero-cyclic radical are attached to different carbon atoms of the aliphatic acid chain, such chain being preferably composed of three carbon atoms.

Our invention relates more specifically to the alkyl ethers of iodo-hydroxy-cyclically substituted aliphatic acids and their salts, one of the cyclic groups being phenyl, while the other cyclic group, if present, is aryl, cycloaliphatic, or heterocyclic, the iodine and ether groups being linked directly to aryl carbon, the straight aliphatic acid chain containing preferably three carbon atoms and being saturated or unsaturated.

The present application is a continuation-in-part of our copending application Serial No. 604,989, filed July 13, 1945, now abandoned.

The preferred compounds of the present invention are of the general formula

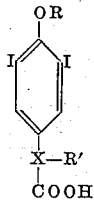

wherein R is an alkyl radical of 1 to 4 carbon atoms, and preferably methyl, R' is an aliphatic radical of from 2 to 8 carbon atoms, or is a phenyl, or a cycloaliphatic radical of 5 or 6 carbon atoms in the ring, while X is a saturated or unsaturated aliphatic radical, of preferably 2 carbon atoms, the radical R' and the illustrated phenyl radical being joined to different carbons of the aliphatic acid chain. Our invention includes also the non-toxic salts of these compounds including the sodium, potassium, and other alkali metal salts, and likewise the non-toxic salts of the alkaline earth group and of other metals. The salts may also be in the form of amine salts, such as those of diethanol amine, triethanol amine, and other non-toxic amines.

Compounds falling within the scope of the present invention are useful as X-ray diagnostic agents, especially for the visualization of the gall bladder, the compounds appearing to have an affinity for lipoid substances, probably because the number of carbon atoms in such compounds is the same as that in various fatty acids normally occurring in the animal body.

Our novel compounds are useful also as chemotherapeutic agents as we have found them to be effective against various types of bacteria.

It has heretofore been considered to be necessary, in the manufacture of iodinated phenyl aliphatic acids, that the phenyl radical of the starting compound contain one or more free hydroxyl groups in order to facilitate the introduction of iodine into such radical. It has also been regarded as essential, where the iodinated compounds were to be used as contrast agents for the gall bladder, that for satisfactory action the compounds contain a benzenoid structure with a free phenolic group. (U. S. patent to Natelson, No. 2,400,433; American Journal of Roentgenology, 56, 201 (1946).) Experience has, however, shown that the hydroxyl group causes undesirable side reactions when the compounds are employed in the roentgen-photography of the gall bladder and other organs of the body, such as burning on urination, nausea and vomiting.

We have found that it is possible greatly to reduce these untoward side reactions by "covering" the hydroxyl group by etherification without disturbing the contrast action of these cyclically substituted aliphatic acids. We have found further, and quite unexpectedly, that the etherified iodohydroxy aryl aliphatic acids have a decreased oral toxicity as compared to the free hydroxy compounds. Larger doses of our improved compounds can accordingly be administered perorally for roentgenographic diagnosis of organs of the body without nausea or pain or organic disturbances.

The present invention accordingly contemplates the provision of etherified iodohydroxy disubstituted propionic and acrylic acids and their non-toxic salts in which the ether group is aliphatic in nature and is either saturated or unsaturated. As already mentioned hereinabove, the substituting groups on the aliphatic acid chain are linked directly to different carbons of such chain. The radical R' in the formula above, as already indicated, may be aliphatic or cyclic, and in the latter case may, for example, be phenyl, pyridyl, furyl, cyclopentyl, cyclopentenyl, cyclohexyl, and cyclohexenyl. Although R', when cyclic, may contain ether and iodine substituents, we prefer componds in which these groups are on the illustrated phenyl radical. While two ether groups with one or two iodine atoms may be joined to the phenyl radical, we prefer compounds containing one ether group and two iodine atoms, the latter in the 3,5-positions.

In one procedure for preparing the compounds of the present invention, α-phenyl-β-(3,5-diiodo- 4-hydroxy phenyl) propionic acid in alkaline solution is reacted with, for example, dimethyl or diethyl sulfate, whereby the methyl or ethyl ether is formed. The same compounds can be obtained by heating the alkaline solution of the starting material with other alkylating agents such as methyl and ethyl iodides, benzylchloride, and the like. The iodo-alkoxy compounds of the present invention can also be obtained by the iodination of alkoxy-phenyl propionic acids. For example, the α-(p-methoxyphenyl)-β-(p-methoxyphenyl) propionic acid can be formed and then iodinated by treatment with iodine monochloride in glacial acetic acid solution, according to the following equation:

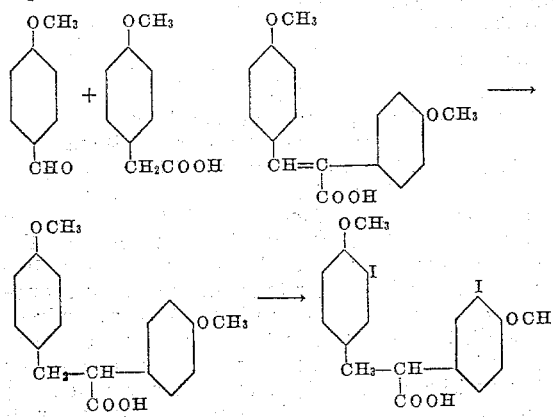

It appears that by covering or blocking the acid-reacting phenolic hydroxyl group, the propionic and acrylic acids become more like the natural fat acids, and the behavior of such compounds in the body is changed over that of the free phenol-substituted acids. Our new iodinated compounds have a more lipophilic character, and for that reason are much more satisfactory for use in roentgenography. As already mentioned, compounds of the present invention are useful not only in roentgenography, but also as chemotherapeutic or germicidal agents. Because the iodine is firmly bound to the phenyl nucleus or nuclei, the danger of irritation or poisoning by splitting off of free iodine is eliminated, and the compounds are excreted from the body without kidney damage, in substantially unchanged condition, whether administered by mouth or by injection.

The compounds of the present invention or the intermediates which by iodination and/or etherification can be converted to such compounds, may in general be prepared by the Perkin reaction or modifications thereof, as described in the applications of Erwin Schwenk and Domenick Papa, Serial Nos. 530,184, now abandoned, 536,834, now Patent No. 2,436,270, and 544,832, now abandoned, and in Patent No. 2,345,384 to Dohrn et al. Thus the hydroxy or etherified iodo compounds can be prepared by condensing an aromatic aldehyde in which the double bond of the aldehyde group forms part of a conjugated system, the second double bond forming one of the double bonds of the phenyl radical, for example, benzaldehyde, with a salt of an aliphatic carboxylic acid having a reactive methylene group contiguous to the carboxyl group, substituted or not on the b-carbon by a phenyl cycloaliphatic or heterocyclic group, in the presence of, for example, a fatty acid anhydride like acetic anhydride, and with the aid of heat. The unsaturated acids obtained by the condensation can, if desired, be hydrogenated in known manner. The iodine may be and preferably is introduced into the phenyl radicals after the formation of the disubstituted aliphated acids. However, some or even all of the iodine atoms which the final product is to contain may be present in the original reacting materials.

Where both substituents on the aliphatic acid chain are phenyl groups, they may each contain one or two iodine atoms and one or two alkoxy groups. It is, however, not necessary that in such case the compound be symmetrical; thus one phenyl group may contain two alkoxy groups and the other only one, and one may contain two iodine atoms and the other only one.

The invention will be further described in the following examples which are presented only for purposes of illustration and not as defining the limits of the invention.

EXAMPLE 1

α,β-Di(3-iodo-4-methoxyphenyl) propionic acid

α,β-Di(4-methoxyphenyl) propionic acid was prepared by the condensation of p-methoxyphenylacetic acid and anisaldehyde, in accordance with the general procedure for the Perkin condensation. The compound obtained after recrystallization from a mixture of acetone and water melted at 217–218° C. The α-(p-methoxyphenyl)-p-methoxycinnamic acid was reduced by any of the known methods, and after recrystallization from acetone and water, the product melted at 123–124° C.

To a solution of 2.9 g. (0.01 m.) of α,β-di(4-methoxy phenyl) propionic acid in 15 ml. of glacial acetic acid at a temperature of 60–80°, there was gradually added a solution of 1.0 ml. (0.02 m.) of iodine monochloride in 10 ml. of glacial acetic acid. The product was obtained by dilution of the acetic acid solution, and on recrystallization from dilute alcohol melted at 154–155° C.

EXAMPLE 2

α-(3-iodo-p-methoxyphenyl)-β-(iodo-3,4-dimethoxyphenyl) propionic acid

The intermediate, α-(p-methoxyphenyl)-β-(3,4-dimethoxyphenyl) propionic acid, was prepared by the Perkin condensation of veratraldehyde and p-methoxy-phenylacetic acid. The α-(p-methoxyphenyl) 3,4-dimethoxycinnamic acid melted at 218–220° C., after recrystallization from acetone and water. This substance on reduction by any of the known methods yielded the substituted propionic acid derivative which melted at 125–126° C., after recrystallization from dilute methyl alcohol.

3.2 g. (0.010 m.) of the proprionic acid, dissolved in 15 ml. of acetic acid, was iodinated in the usual way with 1.0 ml. of iodine chloride dissolved in 10 ml. of acetic acid. Recrystallization from dilute ethanol gave the pure product, M. P. 186.5–187.5°.

EXAMPLE 3

α,β-Di(iodo-3,4-dimethoxyphenyl) propionic acid

The tetramethoxy-diphenyl propionic acid was prepared from 3,4-dimethoxyphenylacetic acid and veratraldehyde via the Perkin reaction. The acrylic acid derivative melted at 215–217° C., after recrystallization from acetone and water. Reduction by any of the known methods yielded the tetramethoxydiphenyl propionic acid derivative melting at 138–139°, after recrystallization from an acetone and water mixture.

1.5 g. (.0043 m.) of α,β-di(3,4-dimethoxyphenyl) proprionic acid, dissolved in 15 ml. of acetic acid, was iodinated in the usual manner with 0.43 ml.

(.0086 m.) of iodine chloride dissolved in 5 ml. of acetic acid. Upon recrystallization from dilute ethanol, the pure product was obtained, M. P. 158–159°.

EXAMPLE 4

α-Phenyl-β-(2,4-dimethoxy-5-iodophenyl) propionic acid

The intermediate, α-phenyl-β-(2,4-dimethoxyphenyl) propionic acid, was prepared by the Perkin condensation of 2,4-dimethoxybenzaldehyde and phenyl acetic acid in the usual manner. The α-phenyl-2,4-dimethoxycinnamic acid melted at 162–164° C., after recrystallization from a mixture of methyl alcohol and water. Reduction of this substance by any of the known methods yielded the corresponding propionic acid which melted at 115–116°.

To a solution of 2.9 g. (0.01 m.) of α-(2,4-dimethoxyphenyl) hydrocinnamic acid in 25 ml. of acetic acid maintained at a temperature of 50–60°, there is added alternately in portions over a period of 2–3 hours, 2.6 g. (0.01 m.) of iodine and 2.4 g. (0.0075 m.) of mercuric acetate. The reaction mixture is then diluted and treated with potassium iodide. The product crystallized out and on recrystallization from dilute ethanol melted at 139.5–140.5°.

EXAMPLE 5

α-Phenyl-β-(iodo-3,4-dimethoxyphenyl) propionic acid

The required α-phenyl-β-(3,4-dimethoxyphenyl) propionic acid was obtained by the reduction of the known acrylic acid derivative. After recrystallization from a mixture of acetone and water, the substituted propionic acid melted at 104.5–105.5° C.

2.9 g. (0.010 m.) of the α-phenyl-β-(3,4-dimethoxyphenyl) propionic acid were iodinated in the usual manner with 0.50 ml. of iodine chloride in acetic acid solution. The crude product melted at 169.5–170.5°, and on recrystallization from dilute alcohol showed a melting point of 171–171.5°.

EXAMPLE 6

α-Cyclohexyl-β-(iodo-3,4-dimethoxyphenyl) propionic acid

The intermediate required for this example was prepared by condensing Δ¹-cyclohexenyl acetic acid and veratraldehyde, in accordance with the Perkin procedure (as described in the application of Schwenk and Papa, Serial No. 544,831, now Patent No. 2,458,066). The resulting α-(Δ¹-cyclohexenyl)-3,4-dimethoxycinnamic acid after recrystallization from a mixture of acetone and water, melted at 190–191° C. This cinnamic acid, when reduced with Raney's alloy and aqueous alkali, yielded the α-cyclohexyl-β-(3,4-dimethoxyphenyl) propionic acid melting at 92–93°, after recrystallization from a mixture of benzene and petroleum ether.

2.9 g. (0.010 m.) of α-cyclohexyl-β-(3,4-dimethoxyphenyl) propionic acid were dissolved in 10 ml. of glacial acetic acid, iodinated in the usual manner with 0.50 ml. of iodine chloride, and dissolved in 5 ml. of acetic acid. On recrystallization from dilute ethanol, the iodo product of M. P. 164–164.5° C. was obtained.

EXAMPLE 7

α-(3-iodo-4-methoxyphenyl)-3-iodo-4-methoxycinnamic acid

There was heated for 20 hours at 100° C. a mixture of 7.2 g. of 3-iodo-4-methoxybenzaldehyde (0.025 m.) with 8.0 g. (0.025 m.) of 3-iodo-4-methoxyphenyl acetic acid, 100 cc. of acetic anhydride, and 10 cc. of triethylamine. After the reaction mixture had cooled, it was decomposed with water and then worked up as usual through sodium carbonate purification. The product was recrystallized from benzene-petroleum ether and melted at 202–203.5°.

EXAMPLE 8

β-(4-methoxy-3,5-diiodophenyl)-α-phenyl propionic acid

Fifty grams of the 4-hydroxy compound were dissolved in 500 cc. of 10% sodium hydroxide and, with stirring, treated with 150 cc. of dimethyl sulfate. The reaction mixture at this stage was diluted to 1500 cc. and an additional 50 cc. of dimethyl sulfate added. The dimethyl sulfate was added in such a manner that several times during the process the reaction mixture became slightly acid. After allowing the mixture to stand over night, it was poured into one liter of water and acidified. The crude material was extracted with ether and the ether evaporated. The residue, on recrystallization from a mixture of chloroform and petroleum ether, yielded the pure methoxy compound melting at 154–155°.

EXAMPLE 9

α-(3-iodo-4-methoxyphenyl)-β-(3-iodo-4-ethoxyphenyl) propionic acid

By condensing p-ethoxybenzaldehyde and p-methoxyphenylacetic acid, there was obtained the dialkoxy substituted acrylic acid which melted at 174–175° C., after recrystallization from a mixture of acetone and water. On reducing this acrylic acid with Raney's alloy and aqueous alkali, the corresponding propionic acid obtained melted at 153–154° C., after recrystallization from acetone and water. Iodination with either iodine monochloride or mercuric acetate and iodine gave the corresponding diiodo derivative which melted at 178–179° C., after recrystallization from ethyl alcohol and water.

EXAMPLE 10

β-Furyl-α-(3-iodo-4-methoxyphenyl) propionic acid

The required intermediate was obtained by the condensation of p-methoxyphenylacetic acid and furfural. This compound, after recrystallization from a mixture of acetone and water, melted at 184.5–185° C. The acrylic acid, when reduced with sodium amalgam and alcohol, yielded the propionic acid of the following formula:

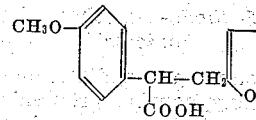

On iodination with either iodine chloride or mercuric acetate and iodine, there was obtained the 3-iodo derivative of the following formula:

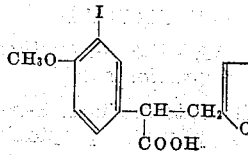

EXAMPLE 11

β-(3-pyridyl)-α-(3-iodo-4-methoxyphenyl) propionic acid

The intermediates for this compound were obtained by the condensation of pyridine 3-aldehyde and p-methoxyphenylacetic acid, followed by reduction of the double bond. The acrylic acid compound which was obtained from the condensation melted at 191.5–192° C., after recrystallization from acetone and water. On treatment with any reducing catalyst, the acrylic acid underwent reduction to the propionic acid, which yields the following iodo derivative on iodination with iodine chloride:

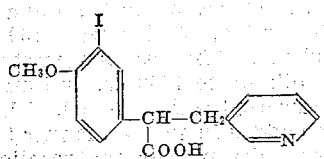

EXAMPLE 12

α-(Phenyl)-β-(3-iodo-4-methoxyphenyl) propionic acid

This substance was obtained by the iodination of the methoxy acid in accordance with the directions described in the previous examples. After recrystallization from alcohol and water, the pure iodomethoxy acid melted at 92–93° C.

EXAMPLE 13

α-Cyclohexyl-β-(3,5-diiodo-4-methoxyphenyl) propionic acid

The diiodohydroxy acid was obtained in accordance with the process of co-pending application, Serial No. 21,835, filed April 19, 1948. Methylation of the hydroxy group was carried out in accordance with the procedure in Example 9.

EXAMPLE 14

α-Ethyl-3,5-diiodo-4-methoxycinnamic acid

The diiodohydroxy acid was secured in accordance with the procedure described in co-pending application, Serial No. 754,600, filed June 13, 1947, now abandoned. Methylation of the hydroxy group was carried out in accordance with the procedure described in Example 9.

EXAMPLE 15

α-n-Butyl-3,5-diiodo-4-methoxycinnamic acid

The diiodohydroxy acid was secured in accordance with the procedure described in co-pending application, Serial No. 754,600, filed June 13, 1947. Methylation of the hydroxy group was carried out in accordance with the procedure described in Example 9.

EXAMPLE 16

α-Ethyl-β-(3,5-diiodo-4-methoxyphenyl) propionic acid

The requisite intermediate, α-ethyl-β-(3,5-diiodo-4-hydroxyphenyl) propionic acid, was secured as described in co-pending application, Serial No. 3,182, filed January 19, 1948, now abandoned. The methoxy compound was obtained essentially as described in Example 9.

EXAMPLE 17

α-n-Butyl-β-(3,5-diiodo-4-methoxyphenyl) propionic acid

The requisite intermediate, α-n-butyl-β-(3,5-diiodo-4-hydroxyphenyl) propionic acid, was prepared as described in co-pending application, Serial No. 3,182, filed January 19, 1948. The methoxy compound was prepared essentially as described in Example 9.

EXAMPLE 18

α-Phenyl-β-(3,5-diiodo-4-isopropoxyphenyl) propionic acid

This ether is secured from the 4-hydroxy compound by the method of Example 9 using isopropyl bromide in place of the dimethyl sulfate. It is advantageous to use 10% sodium hydroxide in 50% alcohol in order to maintain all of components in solution. In addition, better yields of the ether are obtained when the alcoholic mixture is refluxed over night. The isopropyl ether is obtained in the form of a white crystalline solid which can be recrystallized from a mixture of chloroformpetroleum ether or from a large volume of n-hexane.

EXAMPLE 19

α-n-Amyl-β-(3,5-diiodo-4-allyloxyphenyl) propionic acid

The requisite intermediate, α-n-amyl-β-(3,5-diiodo-4-hydroxyphenyl) propionic acid was obtained as described in co-pending application, Serial No. 3,182, filed January 19, 1948. Treatment of the hydroxy compound in 10% sodium hydroxide in 50% aqueous alcohol with allyl bromide yielded the above-named ether.

We claim:
1. Compounds of the general formula

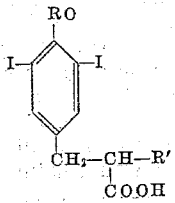

and their non-toxic salts wherein R is a lower alkyl radical of 1 to 3 carbon atoms, R' is a member of the group consisting of aliphatic radicals having 2 to 4 carbon atoms, a phenyl radical, and cycloaliphatic radicals having 5 to 6 carbon atoms in the ring.

2. Compounds of the general formula

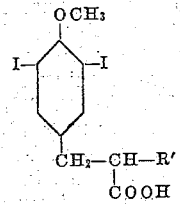

and their non-toxic salts, wherein R' is a monocyclic aryl radical.

3. Compounds of the general formula

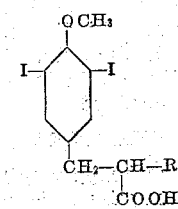

and their non-toxic salts wherein R' is an alkyl radical of 2 to 4 carbon atoms.

4. Compounds of the general formula

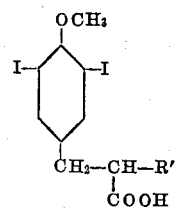

and their non-toxic salts where R' is a cycloaliphatic radical having 5 to 6 carbon atoms in the ring.

5. α-Phenyl-β-(3,5-diiodo-4-methoxyphenyl) propionic acid and its non-toxic salts.

6. α-Butyl-β-(3,5-diiodo-4-methoxyphenyl) propionic acid and its non-toxic salts.

7. α-Cyclohexyl-β-(3,5-diiodo-4-methoxyphenyl) propionic acid and its non-toxic salts.

8. α-Ethyl-β-(3,5-diiodo-4-methoxyphenyl) propionic acid and its non-toxic salts.

DOMENICK PAPA.
ERWIN KLINGSBERG.
ERWIN SCHWENK.

REFERENCES CITED

The following references are of record in the file of this patent:

UNITED STATES PATENTS

| Number | Name | Date |
|---|---|---|
| 2,345,384 | Dohrn et al. | Mar. 28, 1944 |
| 2,400,433 | Natelson et al. | May 14, 1946 |
| 2,487,075 | Schwenk et al. | Nov. 8, 1949 |

FOREIGN PATENTS

| Number | Country | Date |
|---|---|---|
| 517,382 | Great Britain | July 25, 1939 |

OTHER REFERENCES

Bongault: Beilstein (Handbuch, 4th ed.), vol. 10, p. 247 (1927).

Paal et al.: Beilstein (Handbuch, 4th ed.), vol. 10, p. 299 (1927).

Wheeler et al.: Beilstein (Handbuch, 4th ed., 2nd sup.), vol. 10, p. 132 (1932).